UNITED STATES PATENT OFFICE.

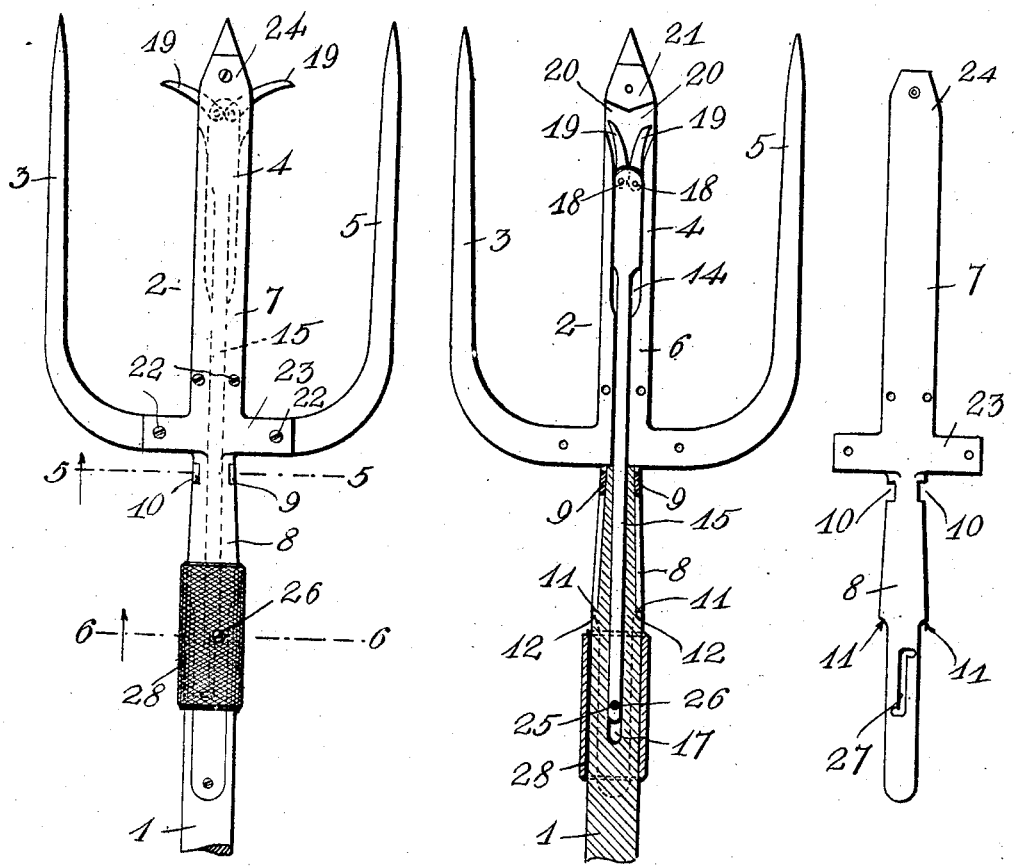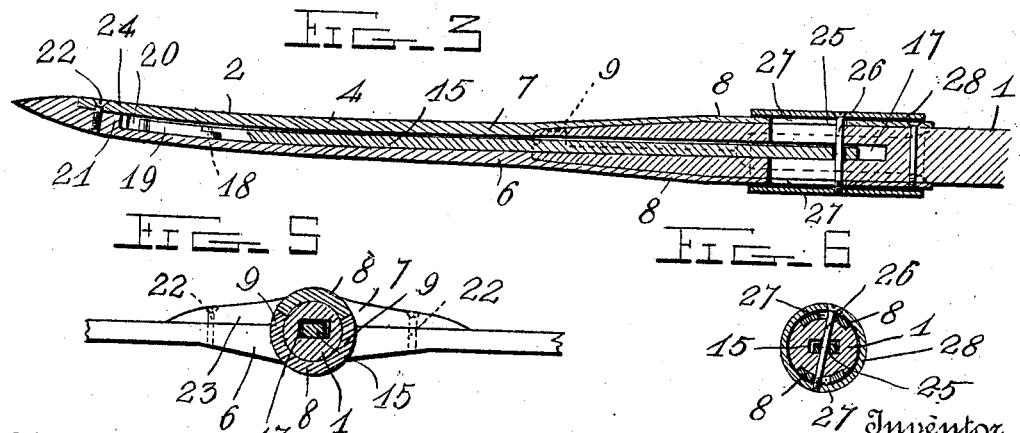

LEONARD E. FATCH, OF CROWN POINT, INDIANA.

FORK.

No. 827,856.

Specification of Letters Patent.

Patented Aug. 7, 1906.

Application filed April 5, 1906. Serial No. 310,167.

*To all whom it may concern:*

Be it known that I, LEONARD E. FATCH, a citizen of the United States, residing at Crown Point, in the county of Lake and State of Indiana, have invented certain new and useful Improvements in Forks; and I do declare the following to be a full, clear, and exact description of the invention, such as will enable others skilled in the art to which it appertains to make and use the same.

My invention relates to improvements in hay-forks and the like; and it consists in the novel construction, combination, and arrangement of parts hereinafter described and claimed.

One object of the invention is to provide a simple and practical device of this character which will effectively retain a quantity of hay upon it while being lifted or transported.

Another object of the invention is to provide a device of this character in which a quantity of hay may be quickly and easily locked upon and released from the same.

The above and other objects, which will appear as the nature of the invention is better understood, are accomplished by the construction illustrated in the accompanying drawings, in which—

Figure 1 is a side elevation of my improved pitchfork, showing the locking means in its projected position. Fig. 2 is a view similar to Fig. 1, showing the top or cover plate removed and the locking means in its retracted position. Fig. 3 is a longitudinal vertical sectional view through the center tine or prong of the fork. Fig. 4 is a detail view of the cover or top plate; and Figs. 5 and 6 are detail transverse sectional views taken, respectively, on the planes indicated by the lines 4 4 and 5 5 in Fig. 1.

Referring to the drawings by numeral, 1 denotes the handle, and 2 the head, of my improved hay or pitchfork. The head 2 is provided with three prongs or tines 3, 4, and 5 and has at the center of its upper end a socket to receive the handle 1. As shown, the head 2 is composed of a lower body section or member 6 and an upper top or cover section 7. Each of the sections 6 7 has upon its upper end one of the half sections or members 8 of the handle-socket, said half-sections 8 being of semicircular form in cross-section and tapered longitudinally. Their inner ends have an interlocking connection formed by tongues 9 upon one adapted to enter recesses 10 in the other, and their outer ends are cut away upon their side edges, as shown at 11, to engage shoulders 12 upon the handle 1, which shoulders are formed by reducing the handle to permit it to enter the socket, as clearly shown in Figs. 4 and 5 of the drawings. The central tine or prong 4 is very much broader than the two outer ones, and it is made hollow, preferably by grooving or channeling the top or upper face of the lower or body portion 6 of the fork, as shown in Fig. 2. This channel or groove 14 is closed by the top or cover section 7 and is provided for the reception of a sliding rod 15, which also extends into the tubular socket 8 and a longitudinally-extending recess 17 in the lower end of the handle 1. The lower end of this sliding rod 16 has pivoted upon it, as shown at 18, spurs or dogs 19, which are adapted to be projected laterally through slots or openings 20 formed in the opposite sides of the center tine 4 adjacent to its pointed end. These spurs or prongs are projected laterally by their engagement with the end wall 21 of the groove 14, and they are caused to swing toward each other when drawn into said groove by the end walls of the openings 20, as will be readily seen upon reference to Fig. 2 of the drawings.

The cover-plate or top section 7 is preferably removably secured upon the lower body portion 6 by means of screws or the like 22, passed through its crossed portion 23 and through the lower end 24 of its portion, which covers the groove 14. This end 24 is seated in the recessed portion of the lower pointed end of the tine 4, as clearly shown in the drawings. The upper end of the sliding rod or bar 15 is formed with a slot or opening 25 to receive a transversely-extending screw-rivet or the like 26, which also extends through longitudinal slots 27 in the upper ends of the half-sections 8 of the handle-socket and into a sliding sleeve or collar 28. The latter has its outer surface milled, so that it is in the form of a hand-grip and slides longitudinally upon the handle to shift the sliding rod 14, and hence project or retract the locking spurs or dogs, the transverse screw or pin 26 sliding in the slots 27 when the sleeve or collar is shifted. In order to lock said sleeve or collar, and hence the spurs or dogs, in either of their two positions, I form in the socket-sections 8 at the ends of the slots 27 transverse notches or recesses in which the screw or pin 26 is adapted to seat by giving the collar or sleeve a slight turn in the proper direction.

The construction, operation, and advantages of the invention will be readily understood from the foregoing description, taken in connection with the accompanying drawings. It will be seen that by simply grasping the collar or sleeve 28 and turning it slightly, so that the transverse pin will be in alinement with the slots 26, the sleeve may be shifted longitudinally upon the handle to either project or retract the locking spurs or dogs and that by again slightly turning the sleeve said parts may be locked in such adjusted position. A fork provided with a locking device of this character for retaining the hay upon its tines will be found very efficient where it is desired to lift and carry a large quantity of hay, straw, or the like from one point to another, since very little will be blown away and practically none will be dropped.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. A fork of the class described having a socket-piece provided with a longitudinal slot and stop-notches extending in reverse directions from the opposite ends of said slot, said fork being further provided with a tine having directing elements; a sliding rod having pivoted dogs at its outer ends turned outwardly by the directing elements of the said tines when said rod is moved outwardly, a sliding and partly-revoluble sleeve on said socket-piece, a handle fastened in the socket-piece and having a longitudinal slot registering with that of the socket-piece, and a pin projecting from the rod, operating in the slots of the handle and socket-piece and attached to the sleeve, for operation thereby, substantially as set forth.

2. A hand-fork of the character described comprising a body-section having one of its tines grooved and a socket portion in alinement with said grooved tine, a top plate or section secured upon said body-section and having a socket portion, said socket portions being adapted to receive said handle and formed with longitudinal slots, a sliding rod in said grooved tine and said socket portions, spurs pivoted upon the lower end of said rod and adapted to be projected through openings in said grooved tine, a sliding sleeve upon said socket portions and handle, and a transverse pin extending through said sleeve, said slots and an opening in said rod, substantially as described.

3. A hand-fork of the character described comprising a body-section having one of its tines grooved and a socket portion in alinement with said grooved tine, a top plate or section secured upon said body-section and having a socket portion, said socket portions being adapted to receive said handle and formed with longitudinal slots, a sliding rod in said grooved tine and said socket portions, spurs pivoted upon the lower end of said rod and adapted to be projected through openings in said grooved tine, a sliding sleeve upon said socket portions and handle, and means for locking said sleeve against longitudinal movement.

In testimony whereof I have hereunto set my hand in presence of two subscribing witnesses.

LEONARD E. FATCH.

Witnesses:
FRANK B. PATTEE,
P. G. FAGEN.